Figure 1:
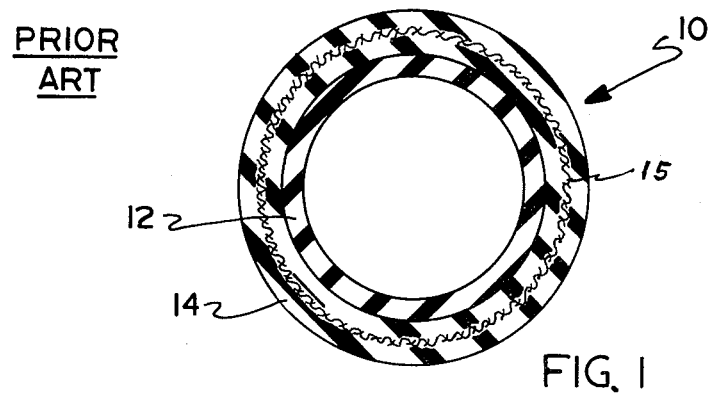

United States Patent [19]

DeMarse et al.

[11] Patent Number: 4,474,217

[45] Date of Patent: Oct. 2, 1984

[54] HOSE STRUCTURE

[75] Inventors: Ernest W. DeMarse, Tallmadge, Ohio; Karl K. Kluss, Concord, N.C.; John M. Sawyer, Cuyahoga Falls; Terry F. Allen, Barberton, both of Ohio

[73] Assignee: The Goodyear Tire & Rubber Company, Akron, Ohio

[21] Appl. No.: 407,923

[22] Filed: Aug. 11, 1982

Related U.S. Application Data

[63] Continuation of Ser. No. 135,413, Mar. 31, 1980, abandoned.

[51] Int. Cl.³ .............................................. F16L 11/00
[52] U.S. Cl. ..................................... 138/137; 138/141
[58] Field of Search ................ 138/137, 126, 125, 141

[56] References Cited

U.S. PATENT DOCUMENTS

| | | | |
|---|---|---|---|
| 2,624,366 | 1/1953 | Pugh | 138/137 |
| 2,988,130 | 6/1961 | Rittenhouse | 138/126 |
| 3,528,457 | 9/1970 | Martin et al. | 138/137 |
| 3,550,640 | 12/1970 | Wagner | 138/141 |
| 3,828,112 | 8/1974 | Johansen et al. | 138/137 |

*Primary Examiner*—Willis Little
*Attorney, Agent, or Firm*—R. D. Thompson; R. E. Larson; C. F. Shifley

[57] ABSTRACT

Hose structure suitable for transport of highly abrasive media including at least two concentric tube layers of elastomeric material. The radially innermost tube layer material is of greater abrasion resistance than a tube layer radially outwardly thereof. A radially outer tube layer material is of greater resilience than that of the radially innermost tube layer. The tube layers may be made visually distinguishable, for example, by being of different colors, so as to serve as a wear indicator.

9 Claims, 2 Drawing Figures

HOSE STRUCTURE

This is a continuation of application Ser. No. 135,413, filed Mar. 31, 1980, now abandoned.

The abstract is not to be taken as limiting the invention of this application and in order to understand the full nature and extent of the technical disclosure of this application reference must be made to the accompanying drawings and the following detailed description.

The invention pertains to a hose structure and particularly to a hose structure suitable for use in highly abrasive service involving combinations of impact-type and sliding-type abrasion.

Hoses are commonly used to transport or convey particulate matter in a fluid media. Examples of such service include in sand suction and dredge service, the transport of slurry compositions such as those containing mining ores or waste, and the transport of particulate-containing fuels such as coal/fuel oil mixtures or coal/water slurries. In some mining applications the particulate matter is transported by a low viscosity fluid such as water or air and contains sharp edged rock particles ranging from a size comparable to a grain of sand up to or greater than three inches (7.6 cm) of maximum dimension. The velocities with which the particulate matter is swept along the bore of the hose by the fluid medium can be quite substantial. For example, an eight inch (20.3 cm) bore diameter reinforced elastomeric hose has been used for the transport of rock particles up to three inches (7.6 cm) in diameter, the rock particles being propelled through the bore of the hose by air moving at about 120 to 160 feet per second (36.6 to 48.8 meters/sec). At such high velocities it is desirable that the tube of the hose be resistant to cutting and gouging to prolong the life of the hose.

Additionally, where such large particles are forced to deviate from a straight path they impact against the tube of the hose structure. Past attempts at manufacture of abrasion resistant hose normally included a single rubber compound and a single inner tube for the reinforced hose. The compound formulation was normally designed to provide optimum resistance to abrasion caused by sliding of the particles along the hose tube or optimum resistance to abrasion caused by impacting of the particles against the hose tube but not to both parts since maximizing the one characteristic generally mandated acceptance of a lesser value of the other characteristic. Hoses used for the transport of abrasive particulate-containing media are generally of large diameter that is, greater than one inch (2.5 cm) internal diameter and often are considerably of much greater diameter up to and including, for example, two feet (60 cm) in diameter.

According to one aspect of the invention there is provided a reinforced hose structure including at least two concentric tube layers of elastomeric material, the radially innermost tube layer being of a material having a greater resistance to abrasion when measured according to ASTM D3389 Rotary Abrasion using an H18 wheel, (one kilogram weight, 5000 revolutions, and ASTM D2228 than a tube layer lying radially outwardly thereof, and a radially outer tube layer of a material having a greater resilience than the radially innermost tube layer when measured according to ASTM B1054.

Figure 2:
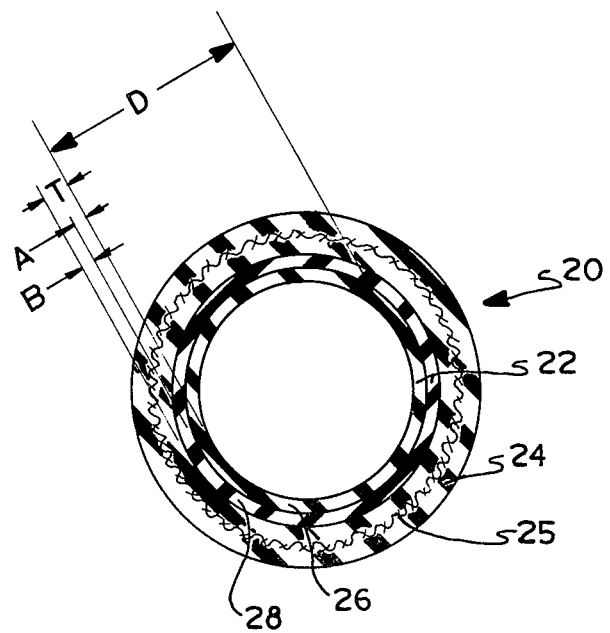

The invention is further described and illustrated in the accompanying drawing in which FIG. 1 is a cross-sectional view of a hose structure according to the prior art, and FIG. 2 is a cross-sectional view of an embodiment of a hose structure according to the invention.

An example of a known hose structure intended for conveyance of abrasive materials is illustrated in FIG. 1. Known hose structure 10 includes a single inner tube 12 of elastomeric material surrounded by a body 14 including reinforcements 15 therein to withstand radial and longitudinal loads imposed on the hose. The tube layer 12 is formed from an elastomeric compound selected according to the anticipated service of the hose. The compound may be designed to provide optimum resistance to sliding type abrasion or to impact-type abrasion but not to both types as with known compounding technology, generally speaking, increasing resistance to sliding-type abrasion results generally in a reduction of resistance to impact-type abrasion and vice versa.

Referring to FIG. 2, there is shown an embodiment of a hose structure 20 according to the invention. In hose structure 20 there are provided at least two coaxial tube layers 26 and 28. Radially outwardly of tube layers 26 and 28 there is provided a hose body 24 including, for example, elastomer embedded reinforcements 25.

The structure of the hose body 24 and the nature of the reinforcements 25 therein are not within the scope of the invention. Suitable structures for these aspects of an abrasive service hose are considered well known to those skilled in the art and will not be discussed further herein.

The radially innermost tube layer 26 is in direct contact with the material being conveyed through the hose. The radially innermost tube layer 26 is formed of an elastomeric material designed to resist cutting, tearing and sliding types of abrasion whereas the radially outer tube layer 28 is formed of an elastomeric material designed primarily for impact resistance and is of greater resilience than that of the radially innermost tube layer 26.

In Table I are listed what are believed to be desirable properties for the radially innermost tube layer and a radially outer tube layer for a hose carrying abrasive media. Also included is comparative data for a pure natural rubber compound having only a cure system added to enable vulcanization. The pure gum compound used for comparison here contains no fillers such as silica or carbon black which are commonly used to modify the properties of the base polymer of an elastomeric compound.

TABLE I

|  | Vulcanized Natural Rubber | Compound for Radially Outer Tube Range | Compound for Radially Innermost Tube Range |
|---|---|---|---|
| ASTM D412 | | | |
| Tensile Strength (psi) | 2300 | 3200/4500 | 2800/4000 |
| Elongation at Rupture (%) | 790 | 350/650 | 300/600 |
| 300% Modulus (psi) | 145 | 1000/1500 | 1200/1850 |
| Hardness (Shore A) | 33 | 40/65 | 60/80 |
| ASTM D3389 | | | |
| Rotary Abrasion (wgt loss in grams) H18 wheel, 1 kg wgt 5000 revolutions ASTM D2228 | 3.6 | 1.3/2.5 | 0.8/2.0 |

TABLE I-continued

|  | Vulcanized Natural Rubber | Compound for Radially Outer Tube Range | Compound for Radially Innermost Tube Range |
| --- | --- | --- | --- |
| (% of std) |  |  |  |
| Pico Abrasion ASTM B1054 | 30.6 | 40/65 | 25/50 |
| Rebound (%) ASTM D624 | 88 | 50/90 | 25/75 |
| Die C Tear (psi) | 181 | 400/600 | 500/850 |

A hose having an eight inch bore diameter was prepared for use in abrasive media transport wherein the material to be pneumatically conveyed included rock particles up to three inches (7.6 cm) in diameter having sharp edges. The physical properties of the compounds chosen for this hose are given in Table II and for comparision there are provided the values obtained on the same tests for pure natural rubber having only a vulcanizing system added thereto.

TABLE II

|  | Vulcanized Natural Rubber | Compound of Radially Outer Tube | Compound of Radially Innermost Tube |
| --- | --- | --- | --- |
| ASTM D412 |  |  |  |
| Tensile Strength (psi) | 2300 | 4000 | 3400 |
| Elongation at Rupture (%) | 790 | 550 | 530 |
| 300% Modulus (psi) | 145 | 1320 | 680 |
| Hardness (Shore A) ASTM D3389 | 33 | 57 | 71 |
| Rotary Abrasion (wgt loss in grams) H18 wheel, 1 kg wgt 5000 revolutions ASTM D2228 (% of Std) | 3.6 | 2.1 | 1.3 |
| Pico Abrasion ASTM B1054 | 30.6 | 48.9 | 30.5 |
| Rebound (%) ASTM D624 | 88 | 71 | 50 |
| Die C Tear (psi) | 181 | 482 | 750 |

It is seen from Table II that in one embodiment of the hose according to the invention the resilience of the radially innermost tube layer material is less than that of the radially outermost tube material as measured according to ASTM B1054 wherein a greater percentage rebound indicates higher resilience. The abrasion resistance of the radially innermost tube material as measured according to ASTM D3389 is greater than that of the radially outer tube material as evidenced by a lower weight loss of the radially innermost tube material. When measured according to ASTM D2228 the radially innermost tube material yields a value of 30.5% of the standard as compared with 48.9% of the standard for the radially outer tube material. As also shown in Table II, the radially innermost tube material when measured according to ASTM D624 using die C has a greater resistance to tearing than the radially outer tube material. The tensile strength of the radially innermost tube material is lower than that of the outer tube material and of comparable order of elongation at rupture. The radially innermost tube material is of greater hardness (71 Shore A) than the radially outer tube material (57 Shore A). The modulus of the radially innermost tube material at 300% elongation is less than that of the radially outer tube material (680 psi versus 1320 psi).

Again referring to FIG. 2 it is seen that the hose structure 20 has a plurality of tube layers 22. Although two tube layers 26 and 28 are illustrated, this is not taken to be limiting as a hose according to the invention may contain more than two concentric tube layers of elastomeric material, each of which may be of a differing elastomeric compound having different physical properties. What is required is that there be at least two concentric tube layers of elastomeric material with the innermost tube layer being of a material having a greater resistance to abrasion when measured according to the ASTM methods indicated hereinabove than a tube layer radially outwardly thereof, and a radially outer tube layer of a material having a greater resilience than the radially innermost tube layer when measured according to ASTM method B1054 for rebound.

The tube layers 22 of the hose structure 20 have an overall thickness T. In hose structure 20 the radially innermost tube layer 26 has a thickness A. The radially outermost tube layer 28 has a thickness B. The radially innermost tube layer 26 may be from about 25% to about 75% of the overall combined thickness T of the tube layers 22 and in a preferred embodiment is about ⅔ of the overall thickness T of the combined tube layers. The overall thickness of the combined tube layers is preferably at least 3% of the bore diameter D of the hose and not more than 10% of the bore diameter D of the hose.

When selecting the compounds to be used for the concentric tube layers it is desired to keep the tear strength as high as possible and the rebound as high as possible. However, compounding to increase resistance to tearing usually results in lower rebound value with known compounding techniques and materials. The use of at least two concentric tube layers permits the hose designer to select compounds for the tube layers with differing properties so as to simultaneously satisfy in the hose tube requirements for high abrasion resistance, high tear resistance and high rebound. The radially innermost tube layer is cushioned by being surrounded by a concentric tube layer having greater resilience. The thickness of the tube layers 22 typically may range from 0.25 inch (0.6 cm) to two inches (5 cm) depending upon the size of the hose, flexibility requirements and life requirements of the hose.

In a preferred embodiment, the radially innermost tube layer 26 and an outer tube layer 28 are of different colors. As the radially innermost tube layer is worn away the outer tube layer becomes visible. The use of differing colors for the concentric tube layers thereby functions as a wear indicator. While a replacement is being obtained a radially outer tube layer continues to permit the hose to provide additional service after the radially innermost tube layer is worn away. Thus the need for replacement may be anticipated and downtime may be reduced by use of such hose.

While certain representative embodiments and details have been shown for the purpose of illustrating the invention it will be apparent to those skilled in the art that various changes and modifications may be made therein without departing from the spirit or scope of the invention.

What is claimed is:

1. A reinforced hose structure including at least two adjacent concentric tube layers of elastomeric material, the radially innermost tube layer of a material having a greater resistance to abrasion, and the radially outer tube layer of a material having a greater resilience than that of the radially innermost tube layer, said radially innermost tube layer being of a material having an abrasion rating from about 0.8 to 2.0 grams loss when measured according to ASTM D 3389 using an H10 wheel, 1 kilogram weight, 5000 revolutions, a rebound of about 25 to 75% as when measured according to ASTM B1054, and the radially outer tube layer of a material having an abrasion rating of about 1.3 to 2.5 grams lost when measured according to ASTM D 3389 using an H18 wheel, 1 kilogram weight, 5000 revolutions, and a rebound of from 50 to 90% when measured according to ASTM B1054.

2. The hose structure of claim 1 wherein the material of the radially innermost tube layer when measured according to ASTM D412 has a tensile strength of about 2800 to 4000 psi, an elongation at rupture of about 300 to 600% of original length, and a modulus at 300% elongation of about 1200 to 1850 psi and a Shore A Hardness of about 60 to 80, and the material of a radially outer tube layer when measured according to ASTM D412 has a tensile strength of about 3200 to 4500 psi, an elongation at rupture of about 350 to 650%, and a modulus at 300% elongation of about 1000 to 1500 psi, and a Shore A Hardness of about 40 to 65.

3. The hose structure of claim 1, or 2 wherein the radially innermost tube layer is of a material having a resistance to tear when measured according to ASTM D624 using Die C from about 500 to 850 psi, and a radially outer tube layer is of a material having a resistance to tear as measured according to ASTM D624 using Die C from about 400 to 600 psi.

4. The hose structure of claim 3 wherein the thickness of the radially innermost tube layer is from about 25 to about 75% of the overall thickness of the combined tube layers.

5. The hose structure of claim 3 having only two tube layers wherein the radially innermost tube layer is about ⅜ of the overall thickness of the combined tube layers.

6. The hose structure of claim 3 wherein the overall thickness of the combined tube layers is at least 3% but not greater than 10% of the bore diameter of the hose.

7. The hose structure of claim 3, wherein the radially innermost tube layer is of a differing color than that of a radially outer tube layer.

8. The hose structure of claim 1 wherein the radially innermost tube layer material has an abrasion rating of about 1.3 grams lost when measured according to ASTM D3389 using an H18 wheel, 1 kilogram weight, 5000 revolutions, a rebound of about 50% when measured according to ASTM B1054, and when measured according to ASTM D412, a tensile strength of about 3400 psi, an elongation at rupture of about 500% and a modulus at 300% elongation of about 680 psi, and a Shore A Hardness of about 71; and wherein the radially outer tube layer material has an abrasion rating of about 2.1 grams lost measured according to ASTM D3389 using an H18 wheel, 1 kilogram weight, 5000 revolutions, a rebound of about 70% when measured according to ASTM B1054, and when measured according to ASTM D412, a tensile strength of about 4000 psi, an elongation at rupture of about 550%, and a modulus at 300% elongation of about 1320 psi, and a Shore A Hardness of about 57.

9. The hose structure of claim 8 wherein the radially innermost tube layer is of a material having a tear strength when measured according to ASTM D624 using Die C of about 750 psi and the radially outer tube has a tear strength using Die C of about 480 psi.

* * * * *